(12) United States Patent
Park et al.

(10) Patent No.: US 10,370,495 B2
(45) Date of Patent: *Aug. 6, 2019

(54) POLYAMIC ACID RESIN, POLYAMIDEIMIDE FILM, AND METHOD FOR PREPARING THE SAME

(71) Applicant: SK INNOVATION CO., LTD., Seoul (KR)

(72) Inventors: Sang Yoon Park, Daejeon (KR); Hyeon Jeong Kim, Daejeon (KR); Tae Sug Jang, Daejeon (KR); Jin Hyung Park, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,964

(22) Filed: Aug. 4, 2017

(65) Prior Publication Data
US 2018/0044475 A1    Feb. 15, 2018

(30) Foreign Application Priority Data

Aug. 11, 2016  (KR) .................. 10-2016-0102556
Jun. 23, 2017  (KR) .................. 10-2017-0079547

(51) Int. Cl.
*C08G 73/14* (2006.01)
*C08G 73/10* (2006.01)
*C08J 5/18* (2006.01)
*C09D 179/08* (2006.01)

(52) U.S. Cl.
CPC ......... *C08G 73/14* (2013.01); *C08G 73/1021* (2013.01); *C08G 73/1039* (2013.01); *C08G 73/1042* (2013.01); *C08G 73/1078* (2013.01); *C08J 5/18* (2013.01); *C09D 179/08* (2013.01); *C08J 2379/08* (2013.01)

(58) Field of Classification Search
CPC ..... C08G 73/14; C08J 2379/00; C09D 179/08
See application file for complete search history.

(56) References Cited

U.S. PATENT DOCUMENTS

2016/0319076 A1* 11/2016 Ju .............................. C08J 5/18

FOREIGN PATENT DOCUMENTS

JP      2002-161136 A     6/2002

* cited by examiner

*Primary Examiner* — Gregory Listvoyb
(74) *Attorney, Agent, or Firm* — Hauptman Ham, LLP

(57) ABSTRACT

Provided are a polyamic acid resin, a polyamideimide film, and a method for preparing the same. More specifically, provided are a polyamic acid resin derived from a combination of specific components, a polyamideimide film capable of implementing high modulus and excellent optical properties while implementing excellent mechanical properties, heat properties, and electrical properties, and a method for preparing the same.

15 Claims, No Drawings

POLYAMIC ACID RESIN, POLYAMIDEIMIDE FILM, AND METHOD FOR PREPARING THE SAME

CROSS-REFERENCE TO RELATED APPLICATIONS

This application claims priority under 35 U.S.C. § 119 to Korean Patent Application No. 10-2016-0102556, filed on Oct. 11, 2016, and Korean Patent Application No. 10-2017-0079547, filed on Jun. 23, 2017, in the Korean Intellectual Property Office, the disclosure of which is incorporated herein by reference in its entirety.

TECHNICAL FIELD

The following disclosure relates to a polyamic acid resin, a polyamideimide film, and a method for preparing the same. More specifically, the following disclosure relates to a polyamic acid resin derived from a combination of specific components, a polyamideimide film including polyamideimide resin derived from a combination of specific components so that high modulus and excellent optical properties are capable of being implemented without reducing physical properties inherent to polyimide, and a method for preparing the same.

BACKGROUND

In general, polyimide has been applied to various fields including insulating substrates for forming circuits and devices due to excellent mechanical properties and heat properties. However, since a charge transfer complex is formed between aromatic rings during polymerization, the polyimide is colored with brown or yellow color, and thus, a transmittance in a visible light region is low, which has difficulty in being applied to display materials.

As a method of preparing the polyimide to be colorless and transparent, a method of suppressing formation of the charge transfer complex in a molecule by using alicyclic diamine or aliphatic diamine as a diamine component has been known. Japanese Patent Laid-Open Publication No. 2002-161136 (Patent Document 1) discloses polyimide obtained by imidization of a polyimide precursor formed with an aromatic acid dianhydride such as pyromellitic dianhydride, etc., and trans-1,4-diaminocyclohexane. Even though the polyimide exhibits high transparency, there is a problem in that mechanical properties are deteriorated.

Various methods for converting the yellow color of polyimide into colorless transparency have been attempted. However, there is difficulty in approaching the conversion due to problems in a preparation process, such as a rapid increase in viscosity during polymerization or difficulty in refining, etc. For example, a method of using a functional monomer, a method of using a solvent containing an inorganic salt, or the like, has been attempted, but it is still insufficient to simultaneously implement optical properties and mechanical properties, and there is a problem in that deterioration in physical properties inherent to polyimide is inevitable.

Meanwhile, a range of application of the display materials has been diversified according to development of various electronic devices. Research and development for replacing a cover glass for a display with a polymer material have been actively conducted. Thus, it is urgently required to develop a technique for improving optical characteristics while simultaneously implementing excellent mechanical properties inherent to polyimide in various display material fields including a material for replacing the cover glass.

RELATED ART DOCUMENT (Patent Document 1) Japanese Patent Laid-Open Publication No. 2002-161136 (Jun. 4, 2002)

SUMMARY

An embodiment of the present invention is directed to providing a polyamic acid resin capable of implementing excellent mechanical properties, high light transmittance, particularly, high light transmittance over an entire visible light wavelength region, and a low Yellow index, and a polyamideimide film including polyamideimide resin derived from a combination of specific components so that high modulus is capable of being implemented, and a method for preparing the same.

In one general aspect, there is provided a polyamideimide film including: polyamideimide resin derived from aromatic diamine including 2,2'-bis(trifluoromethyl)benzidine (TFMB), cycloaliphatic dianhydride, and two or more aromatic diacid dichlorides.

The cycloaliphatic dianhydride may be cyclobutane tetracarboxylic dianhydride.

The aromatic diacid dichloride may include two or more selected from the group consisting of isophthaloyl dichloride, terephthaloyl dichloride, 1,1'-biphenyl-4,4'-dicarbonyl dichloride, 1,4-naphthalene dicarboxylic dichloride, 2,6-naphthalene dicarboxylic dichloride, and 1,5-naphthalene dicarboxylic dichloride.

The aromatic diacid dichloride may be isophthaloyl dichloride (IPC) and terephthaloyl dichloride (TPC).

The aromatic diacid dichloride may have a content of 40 to 90 moles with respect to 100 moles of the aromatic diamine.

The polyamideimide film may have a light transmittance, measured at 550 nm, of 88% or more, and a Yellow index, measured according to ASTM E313 standard, of 3.0 or less.

The polyamideimide film may have a modulus of 5.0 GPa or more, measured at an extension rate of 25 mm/min using UTM 3365 manufactured by Instron.

The polyamideimide film may have a light transmittance, measured at 550 nm, of 88% or more, and a Yellow index, measured according to ASTM E313 standard, of 3.0 or less, based on a thickness of 45 to 55 μm.

The polyamideimide film may have a modulus of 5.0 GPa or more, measured at an extension rate of 25 mm/min using UTM 3365 manufactured by Instron, on a specimen having a thickness of 45 to 55 μm, a length of 50 mm, and a width of 10 mm.

In another general aspect, there is provided a method for preparing a polyamideimide film including: (a) preparing a polyamic acid solution by dissolving aromatic diamine containing 2,2'-bis(trifluoromethyl)benzidine in an organic solvent, and adding and reacting cycloaliphatic dianhydride and two or more aromatic diacid dichlorides, (b) preparing polyamideimide resin by imidization of the polyamic acid solution, and (c) applying a polyamideimide solution in which the polyamideimide resin is dissolved in the organic solvent.

The cycloaliphatic dianhydride may be cyclobutane tetracarboxylic dianhydride.

The aromatic diacid dichloride may be copolymerized in a content of 40 to 90 moles with respect to 100 moles of the aromatic diamine.

The aromatic diacid dichloride may be terephthaloyl dichloride and isophthaloyl dichloride.

In step (b), the polyamic acid solution may further include any one or two or more selected from an imidization catalyst and a dehydrating agent.

The polyamic acid solution in step (a) may have a solid content of 3 to 20 wt %.

A polyamic acid resin may be derived from aromatic diamine including 2,2'-bis(trifluoromethyl)benzidine, cycloaliphatic dianhydride, and two or more aromatic diacid dichlorides.

DETAILED DESCRIPTION OF EMBODIMENTS

Hereinafter, a polyamic acid resin, a polyamideimide film, and a method for preparing the same according to the present invention are described in detail with reference to preferred embodiments. However, they are not intended to limit the protective scope defined by the claims of the present invention. Here, unless technical and scientific terms used herein are defined otherwise, they have meanings understood by those skilled in the art to which the present invention pertains.

Unless explicitly described to the contrary, the term "comprise" and variations such as "comprises" or "comprising" will be understood to further include other elements rather than excluding other elements throughout the specification.

In the present specification, "polyamic acid solution" is used in the same meaning as "polyamic acid resin composition".

The present inventors surprisingly found that a polyamic acid resin derived from a combination of specific diamine, dianhydride and two or more aromatic diacid dichlorides, and a polyamideimide film formed using the same could remarkably reduce a Yellow index, increase light transmittance throughout a visible light region to thereby implement excellent optical properties while simultaneously improving mechanical strength including high modulus, and completed the present invention.

Specifically, the present invention provides a polyamic acid resin derived from specific diamine, cycloaliphatic dianhydride, and two or more aromatic diacid dichlorides to implement a high modulus and excellent optical properties as well as mechanical properties and heat properties inherent to polyimide, thereby providing a resin and a film which are applicable to various fields including image display devices, etc., a pollyamideimide film prepared using the same, and a method for preparing the same.

The specific diamine may be an aromatic diamine into which a fluorine substituent is introduced. More preferably, the aromatic diamine may be 2,2'-bis(trifluoromethyl)benzidine. The aromatic diamine may provide excellent optical properties due to a charge transfer effect of the fluorine substituents. In addition, it is possible to dramatically improve the optical properties such as high light transmittance and a low Yellow index, etc., and to implement high modulus in physical properties of the polyamideimide film formed by using the polyamic acid resin derived from a combination with other monomers.

In the present invention, the aromatic diamine component of the polyamic acid resin may be used in combination with known aromatic diamine components other than 2,2'-bis(trifluoromethyl)benzidine. However, the use of 2,2'-bis(trifluoromethyl)benzidine alone is more preferable to implement an effect to be achieved.

In the present invention, the cycloaliphatic dianhydride is differentiated from aromatic dianhydride. That is, it is difficult to achieve a desired effect when the cycloaliphatic dianhydride used in the present invention is used together with the aromatic dianhydride. However, by using the cycloaliphatic dianhydride alone, it is possible to implement a synergistic effect of optical properties and high modulus through a combination with other components in the composition.

The cycloaliphatic dianhydride is not largely limited, but may be, for example, any one selected from the group consisting of 1,2,3,4-cyclobutane tetracarboxylic dianhydride (CBDA), 5-(2,5-dioxotetrahydrofuryl)-3-methylcyclohexene-1,2-dicarboxylic dianhydride (DOCDA), bicyclooctene-2,3,5,6-tetracarboxylic dianhydride (BODA), 1,2,3,4-cyclopentane tetracarboxylic dianhydride (CPDA), 1,2,4,5-cyclohexane tetracarboxylic dianhydride (CHDA), 1,2,4-tricarboxy-3-methylcarboxycyclopentane dianhydride, 1,2,3,4-tetracarboxycyclopentane dianhydride and a derivative thereof, or a mixture of two or more thereof. More preferably, the cyclobutane tetracarboxylic dianhydride is more preferable to be used.

The cycloaliphatic dianhydride may be included at a content of 10 to 60 moles, more preferably 10 to 50 moles, with respect to 100 moles of the aromatic diamine, which is more preferable to obtain an excellent polyamic acid solution and an excellent polyamideimide film.

In the present invention, the aromatic diacid dichloride forms an amide structure in a polymer chain, which is able to significantly improve not only optical physical properties but also mechanical strength including the modulus. It is more preferable to use the two or more aromatic diacid dichlorides in combination.

The aromatic diacid dichloride may be a mixture of two or more selected from the group consisting of isophthaloyl dichloride (IPC), terephthaloyl dichloride (TPC), 1,1'-biphenyl-4,4'-dicarbonyl dichloride (BPC), 1,4-naphthalene dicarboxylic dichloride, 2,6-naphthalene dicarboxylic dichloride, 1,5-naphthalene dicarboxylic dichloride, and a derivative thereof, but is not limited thereto.

The two kinds or more of aromatic diacid dichlorides may preferably include isophthaloyl dichloride (IPC) and terephthaloyl dichloride (TPC), and more preferably consist of isophthaloyl dichloride (IPC) and terephthaloyl dichloride (TPC) in achieving desired physical properties.

More preferably, the aromatic diacid dichloride may be included in a content of 40 moles or more with respect to 100 moles of the aromatic diamine. The aromatic diacid dichloride may be included in a content of more than 40 moles, preferably, 50 to 90 moles, and more preferably, 50 to 80 moles. When the above-described range is satisfied, excellent optical properties may be implemented without reducing desired balance of physical properties, that is, mechanical properties and heat properties, through a combination with other components in the composition. In particular, high light transmittance and the Yellow index may be further reduced at the same time, and a synergistic effect that is capable of remarkably improving the modulus may be implemented.

A molar ratio (IPC/TPC) of isophthaloyl dichloride (IPC) and terephthaloyl dichloride (TPC) which are the most preferable in the aromatic diacid dichlorides, may be 0.3 to 4.0, more preferably, 0.3 to 1.5 in view of physical properties.

Further, the aromatic diacid dichloride is not limited to the above-exemplified compounds, and may be further used by mixing with a derivative derived therefrom or other acid halide compounds, but it is more preferable to use the two or more aromatic diacid dichlorides in view of improvement of physical properties.

In the present invention, an equivalence ratio of a mixture of the aromatic diamine, the cycloaliphatic dianhydride, and the two or more aromatic diacid dichlorides is preferably 1:0.9 to 1.1, more preferably, closer to 1:1. When the above-described range is satisfied, it is more preferable in that physical properties of the film including film-forming properties are improved when the film is molded from polyamideimide resin which is obtained by imidization of the polyamic acid resin derived from the monomers.

The polyamic acid solution refers to a solution of the above-described monomers, and includes an organic solvent for a solution polymerization reaction. The organic solvent is not largely limited in view of a kind, and preferably, may be, for example, any one or two or more polar solvents selected from dimethylacetamide (DMAc), N-methyl-2-pyrrolidone (NMP), dimethylformamide (DMF), dimethylsulfoxide (DMSO), acetone, diethyl acetate, m-cresol, etc.

An exemplary embodiment of a preferred polyamic acid resin in the present invention may be a 4-membered copolymer obtained by copolymerization of an oligomer consisting of 2,2'-bis(trifluoromethyl)benzidine and cyclobutane tetracarboxylic dianhydride, isophthaloyl dichloride and terephthaloyl dichloride. The polyamic acid solution including the 4-membered copolymer resin and the solvent may be imidized by further including any one or two or more selected from an imidization catalyst and a dehydrating agent in addition to the polyamic acid resin. The imidization catalyst may be any one or two or more selected from pyridine, isoquinoline, and β-quinoline. In addition, the dehydrating agent may be any one or two or more selected from acetic anhydride, phthalic anhydride, and maleic anhydride, but is not necessarily limited thereto.

According to the present invention, the polyamideimide resin may be obtained by imidizing the above-described polyamic acid solution. Here, the imidization may be performed by known imidization methods. Preferably, it is preferable to perform chemical imidization. More preferably, the polyamic acid solution is chemically imidized using pyridine and acetic anhydride.

The polyamic acid solution according to the present invention may further include various types of additives. The additive may be any one or two or more selected from a flame retardant, an adhesion promoter, an inorganic particle, an antioxidant, an ultraviolet ray inhibitor, a plasticizer, an antistatic agent, etc., but the additive is not necessarily limited thereto.

In addition, the present invention provides an image display device including the above-described polyamideimide film.

Further, the present invention may provide polyamideimide resin which is an imide of the above-described polyamic acid resin.

Further, the present invention provides a method for preparing a polyamideimide film including:
(a) preparing a polyamic acid solution by dissolving aromatic diamine containing 2,2'-bis(trifluoromethyl)benzidine in an organic solvent, and adding and reacting cycloaliphatic dianhydride and two or more aromatic diacid dichlorides,
(b) preparing polyamideimide resin by imidization of the polyamic acid solution, and
(c) applying a polyamideimide solution in which the polyamideimide resin is dissolved in the organic solvent.

In the present invention, the method for preparing a polyamideimide film is not largely limited, but it is preferably performed by using a reactor equipped with a stirrer, a nitrogen injection device, a dropping device, a thermoregulator, and a cooler.

Step (a) of preparing the polyamic acid solution according to an exemplary embodiment may be performed by adding an organic solvent to a reactor to dissolve aromatic diamine, followed by reacting with cycloaliphatic dianhydride, and adding and reacting two or more aromatic diacid dichlorides.

In addition, step (a) of preparing the polyamic acid solution according to another exemplary embodiment may be performed by adding an organic solvent to a reactor to dissolve aromatic diamine, followed by reacting with two or more aromatic diacid dichlorides, and reacting with an acid anhydride including cycloaliphatic dianhydride. It is more preferable in that the content of the aromatic diacid dichloride in the finally obtained polymer may be increased, even though a polymerization concentration, that is, a solid content is high, uniformity of the polymerization reaction may be excellent, and high modulus may be implemented in addition to excellent optical properties.

At the time of preparing the polyamic acid solution, it is preferable that the aromatic diamine is sufficiently dissolved by adding the aromatic diamine preferentially to the organic solvent. Here, the organic solvent to be used is the same as described above, preferably, dimethylacetamide or N-methyl-2-pyrrolidone. Further, a content of the organic solvent may be appropriately selected in consideration of a molecular weight of the polyamideimide resin which is a copolymer derived from the monomers, and may be 80 to 97 wt % of the total content of the composition. Preferably, the content of the organic solvent may be 80 to 97 wt %, more preferably, 85 to 95 wt %. The content of the organic solvent may be more preferably 87 to 95 wt %. That is, a solid content may be 3 to 20 wt %, preferably 5 to 15 wt %, and more preferably 5 to 13 wt %.

When the content of the organic solvent is less than 80 wt %, gelation may occur in the polymerization process, it may be difficult to obtain a uniform solution, and purification using the solvent may not be easily performed since a high viscosity solution beyond the usable range is formed. When the purification is not properly performed as described above, optical physical properties such as light transmittance, Yellow index, etc., may be deteriorated when the film is formed. In addition, when the content of the organic solvent is more than 97 wt %, the solution may be formed, but a yield of the polyamideimide resin may be reduced.

Further, the polyamic acid solution preferably has a viscosity of 1 cps to 50,000 cps, preferably 1 cps to 30,000 cps, measured at 25° C. using a Brookfield viscometer. More preferably, the viscosity may be 1 cps to 15,000 cps.

Step (a) of preparing the polyamic acid solution is a step of obtaining a polyamic acid resin copolymerized by adding and reacting two kinds or more of aromatic diacid dichlorides to the polyamic acid solution. Here, the content of the two kinds or more of aromatic diacid dichlorides may be controlled to improve optical properties without deteriorating mechanical properties and heat properties.

The two or more aromatic diacid dichlorides may have a content of 40 to 90 moles with respect to 100 moles of the aromatic diamine. The aromatic diacid dichloride may be included in a content of more than 40 moles, preferably, 50 to 90 moles, and more preferably, 55 to 80 moles.

More preferably, a molar ratio (IPC/TPC) of isophthaloyl dichloride (IPC) and terephthaloyl dichloride (TPC) which are the most preferable in the two or more aromatic diacid dichlorides, may be 0.3 to 4.0, more preferably, 0.3 to 1.5.

It is more preferred that the polyamic acid solution obtained through the reaction of the monomers in step (a) may have a polymerization concentration, that is, a solid content of 3 to 20 wt %, preferably 5 to 15 wt %, and more preferably 5 to 13 wt %.

The step (a) is preferably performed under an inert gas atmosphere, and for example, is performed under reflux with nitrogen or argon gas in the reactor. In addition, the reaction may be performed at room temperature to 80° C., specifically, 20° C. to 80° C., for 30 minutes to 24 hours, but the reaction temperature range and the reaction time are not necessarily limited thereto.

The imidization in step (b) is a step of imidizing the polyamic acid solution prepared in step (a) to obtain polyamideimide resin, wherein known imidization methods, for example, a heat imidization method, a chemical imidization method, a combination of the heat imidization method and the chemical imidization method may be applied. Preferably, the chemical imidization method is preferable, but the imidization is not limited thereto.

Further, the imidization may be performed before a polyamideimide solution is applied, or may be performed after the polyamideimide solution is applied, and the imidization is not limited since it may be applied by various known methods.

In the present invention, the chemical imidization may be performed by further including any one or two or more selected from the imidization catalyst and the dehydrating agent to the prepared polyamic acid solution. When the chemical imidization is performed by adding any one or two or more selected from the imidization catalyst and the dehydrating agent to the polyamic acid solution prepared in step (a), it is more preferable in view of physical properties of the polyamideimide resin to be obtained. More preferably, any one or two or more selected from the imidization catalyst and the dehydrating agent may be added to the polyamic acid solution, followed by imidization and purification using a solvent, thereby obtaining a solid, and the solid may be dissolved in a solvent to obtain a polyamidimide solution.

Here, the dehydrating agent may be any one or more selected from acetic anhydride, phthalic anhydride, and maleic anhydride. The imidization catalyst may be any one or more selected from pyridine, isoquinoline, β-quinoline, etc. However, the dehydrating agent and the imidization catalyst are not limited thereto.

At the time of purifying the solution, the solvent is preferably a solvent in which solubility of the polyamic acid resin or the polyamideimide rein solid is significantly reduced, and for example, the solvent is preferably any one or more selected from water and alcohol.

The solvent used at the time of obtaining the polyamideimide resin imidized by dissolving the obtained solid in the solvent may be the same as the organic solvent used in the preparation of the polyamic acid solution. Here, the solvent may have a content of 80 to 97 wt %. Preferably, the content of the solvent may be 80 to 95 wt %, more preferably, 80 to 90 wt %.

In addition, a viscosity of the polyamideimide resin solution obtained by dissolving the finally obtained polyamideimide in the solvent may be 5,000 to 500,000 cps, preferably, 8,000 to 300,000 cps, and more preferably, 10,000 to 200,000 cps. Here, the viscosity is measured at 25° C. using a Brookfield viscometer.

The polyamideimide obtained in the present invention may have a weight average molecular weight of 50,000 to 1,000,000 g/mol, preferably 50,000 to 800,000 g/mol, and more preferably 50,000 to 500,000 g/mol. Here, the weight average molecular weight is measured using 1260 Infinity manufactured by Agilent Technologies on polystyrene as a standard specimen, wherein PL gel Olexis was used as a column, and the specimen had 4 mg in 100 ml of LiCl (concentration: 0.5 wt %) with DMAc as a solvent. Further, the polyamideimide may have a glass transition temperature of 200 to 400° C., and preferably 320 to 390° C.

The method may further include (c) applying a polyamideimide solution in which the polyamideimide resin is dissolved in the solvent, followed by heat treatment. The heat treatment is a step of casting the polyamideimide solution on a support such as a glass substrate, or the like, followed by heat treatment to mold a film. Here, the term "polyamideimide solution" which describes step (c) means a coating composition for preparing the polyamideimide film containing polyamideimide resin.

The heat treatment is preferably performed stepwise in an exemplary embodiment. The heat treatment may be preferably performed by a stepwise heat treatment at 80 to 100° C. for 1 minute to 2 hours, at 100 to 200° C. for 1 minute to 2 hours, and at 250 to 300° C. for 1 minute to 2 hours. More preferably, the stepwise heat treatment according to each temperature range is performed for 30 minutes to 2 hours. Here, it is more preferable that the stepwise heat treatment is performed by raising a temperature at a range of 1 to 20° C./min when moving each step. In addition, the heat treatment may be performed in a separate vacuum oven, but is not necessarily limited thereto. In addition, the application may be performed to form the film on the support by using an applicator.

The polyamideimide film may have a modulus of 5.0 Gpa or more, specifically, 5.0 to 10 GPa, and preferably, 5.0 to 8.0 GPa, measured by pulling a specimen at 25 mm/min, using UTM 3365 manufactured by Instron. Here, the modulus may be measured based on a specimen having a thickness of 45 to 55 μm, a length of 50 mm, and a width of 10 mm.

Further, the light transmittance measured at 550 nm using a UV-visible spectrophotometer may be 88% or more, preferably 89% or more, and specifically, the light transmittance measured at 550 nm may be 88 to 99%, preferably 89 to 95%. In addition, the light transmittance measured at 400 nm may be 80% or more, preferably 81% or more. Specifically, the light transmittance measured at 400 nm may be 80 to 99%, preferably 81 to 95%.

In addition, haze (%) may be 0.80 or less, preferably 0.78 or less, measured according to ASTM D1003 standard using a haze meter (Nippon Denshoku, NDH 5000). Specifically, the haze (%) may be 0.10 to 0.80, preferably 0.10 to 0.78.

In addition, the polyamideimide film may have a Yellow index of 3.00 or less, preferably 2.87 or less, measured according to ASTM E313. Specifically, the Yellow index may be 1.00 to 3.00, preferably 1.00 to 2.87. Here, the Yellow index is measured using HunterLab's ColorQuest XE. Further, the physical properties may be measured on the basis of a polyamideimide film having a thickness of 45 to 55 μm.

The polyamidimide film capable of implementing excellent physical properties as described above may be derived from aromatic diamine, cycloaliphatic dianhydride, and two or more aromatic diacid dichlorides. Further, the aromatic diamine may include 2,2'-bis(trifluoromethyl)benzidine. The polyamideimide film prepared by such a combination may implement an excellent modulus as well as optical properties such as excellent light transmittance, a low Yellow index, etc., as described above.

In the present invention, various types of molded articles may be manufactured by using the above-described polyamideimide. For example, the polyamideimide may be applied to a film, a printed wiring board including a protective film or an insulating film, a flexible circuit board, etc., but is not limited thereto. Preferably, the polyamideimide acid film may be applied to a protective film capable of replacing a cover glass, and thus, may have a wide range of applications in various industrial fields including a display.

Hereinafter, exemplary embodiments of the present invention have been disclosed for illustrative purposes in detail, and thus, the present invention is not limited to the following Examples.

Physical properties of the present invention were measured as follows.

(1) Light Transmittance (Unit: %)

The light transmittance of each of the films prepared in the Examples and Comparative Examples was measured by using a Nippon Denshoku 300 instrument.

(2) Uniformity of Polymerization Reaction

All of a solvent for polymerization and a reaction material were added to perform a polymerization reaction. After 24 hours of the polymerization reaction, a case where uniformity of the polymerization reaction was good was marked with ○, and a case where uniformity of the polymerization reaction was not good was marked with X, except for gelation occurred so that stirring was no longer possible based on the stirrer, or except for a case where an insoluble solid with transparent color was found, wherein the insoluble solid was not filtered on a 80 mesh after diluting the obtained solution 100 CPS using a solvent used in the polymerization and filtering the resulting solution through the mesh.

(3) Yellow Index

The Yellow index of each of the films prepared in the Examples and Comparative Examples was measured using HunterLab's ColorQuest XE (Mode type: Total transmission, Area view: 0.375 in., UV filter: Nominal) according to ASTM E313 standard.

(4) Modulus

The modulus was measured by pulling each of the films having a length of 50 mm and a width of 10 mm prepared in the Examples and Comparative Examples at 25° C. at 25 mm/min, using UTM 3365 manufactured by Instron.

(5) Haze (%)

The haze of each of the films prepared in the Examples and Comparative Examples was measured according to ASTM D1003 standard using a haze meter (Nippon Denshoku, NDH 5000).

(6) Viscosity

The viscosity was measured at 25° C. using a Brookfield viscometer (Dv2TRV-cone&plate, CPA-52Z).

Example 1

N,N-dimethylacetamide (DMAc) and 2,2'-bis(trifluoromethyl)benzidine (TPMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:CBDA:IPC:TPC was 100:20:30:50 as shown in a composition ratio of Table 1 below and a solid content was 6.5 wt %, and a temperature of the reactor was maintained at 30° C. A viscosity of the obtained resin composition was 1,800 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder.

12 g of the obtained polyamideimide powder was dissolved in 88 g of N,N-dimethylacetamide (DMAc), and then, solution casting was performed on a glass substrate using an applicator. The final solution had a viscosity of 13,500 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 46 μm.

Example 2

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:CBDA:IPC:TPC was 100:20:20:60 as shown in a composition ratio of Table 1 below and a solid content was 6.5 wt %, and a temperature of the reactor was maintained at 30° C. A viscosity of the obtained resin composition was 2,450 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder.

12 g of the obtained polyamideimide powder was dissolved in 88 g of N,N-dimethylacetamide (DMAc), and then, solution casting was performed on a glass substrate using an applicator. The final solution had a viscosity of 15,600 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 46 μm.

Example 3

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:CBDA:IPC:TPC was 100:30:20:50 as shown in a composition ratio of Table 1 below and a solid content was 6.5 wt %, and a temperature of the reactor was maintained at 30° C. A viscosity of the obtained resin composition was 2,600 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder.

12 g of the obtained polyamideimide powder was dissolved in 88 g of N,N-dimethylacetamide (DMAc), and then, solution casting was performed on a glass substrate using an applicator. The final solution had a viscosity of 19,700 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 48 μm.

Example 4

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:CBDA:IPC:TPC was 100:40:30:30 as shown in a composition ratio of Table 1 below and a solid content was 6.5 wt %, and a temperature of the reactor was maintained at 30° C. A viscosity of the obtained resin composition was 3,100 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder.

12 g of the obtained polyamideimide powder was dissolved in 88 g of N,N-dimethylacetamide (DMAc), and then, solution casting was performed on a glass substrate using an applicator. The final solution had a viscosity of 21,300 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 48 μm.

Example 5

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:CBDA:IPC:TPC was 100:40:20:40 as shown in a composition ratio of Table 1 below and a solid content was 6.5 wt %, and a temperature of the reactor was maintained at 30° C. A viscosity of the obtained resin composition was 1,620 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder.

12 g of the obtained polyamideimide powder was dissolved in 88 g of N,N-dimethylacetamide (DMAc), and then, solution casting was performed on a glass substrate using an applicator. The final solution had a viscosity of 28,400 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 46 μm.

Example 6

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:CBDA:IPC:TPC was 100:50:30:20 as shown in a composition ratio of Table 1 below and a solid content was 6.5 wt %, and a temperature of the reactor was maintained at 30° C. A viscosity of the obtained resin composition was 3,200 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder.

12 g of the obtained polyamideimide powder was dissolved in 88 g of N,N-dimethylacetamide (DMAc), and then, solution casting was performed on a glass substrate using an applicator. The final solution had a viscosity of 22,500 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 45 μm.

Example 7

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:CBDA:IPC:TPC was 100:50:40:10 as shown in a composition ratio of Table 1 below and a solid content was 6.5 wt %, and a temperature of the reactor was maintained at 30° C. A viscosity of the obtained resin composition was 2,850 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder.

12 g of the obtained polyamideimide powder was dissolved in 88 g of N,N-dimethylacetamide (DMAc), and then, solution casting was performed on a glass substrate using an applicator. The final solution had a viscosity of 20,700 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 45 μm.

Example 8

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:CBDA:IPC:TPC was 100:20:40:40 as shown in a composition ratio of Table 1 below and a solid content was 6.5 wt %, and a temperature of the reactor was maintained at 30° C. A viscosity of the obtained resin composition was 1,610 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour.

Then, the solution was precipitated with an excessive content of methanol, and the resultant product was filtered to obtain a solid, and the obtained solid was vacuum-dried at 50° C. for 6 hours or more to obtain polyamideimide powder.

12 g of the obtained polyamideimide powder was dissolved in 88 g of N,N-dimethylacetamide (DMAc), and then, solution casting was performed on a glass substrate using an applicator. The final solution had a viscosity of 12,100 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 45 μm.

Example 9

N,N-dimethylacetamide (DMAc) and 2,2'-bis(trifluoromethyl)benzidine (TFMB) were added to a reactor under a nitrogen atmosphere, and the mixture was thoroughly stirred. Then, terephthaloyl dichloride (TPC) and isophthaloyl dichloride (IPC) were added thereto, and stirred for 6 hours, followed by dissolution and reaction. Then, a reaction product obtained by precipitation and filtration using an excessive content of methanol was vacuum-dried at 50° C. for 6 hours or more, and to the reaction product, DMAc was added together and dissolved in the reactor under a nitrogen atmosphere. Then, cyclobutane tetracarboxylic dianhydride (CBDA) was added in the reactor under the nitrogen atmosphere, and stirred well until dissolved. Here, an amount of each monomer was adjusted so that a molar ratio of TFMB:CBDA:IPC:TPC was 100:25:20:55 as shown in a composition ratio of Table 1 below. A viscosity of the obtained resin composition was 11,600 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour. Here, the solution was controlled to have a solid content of 15 wt %, and solution casting was performed on a glass substrate using an applicator. The final solution had a viscosity of 150,200 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 48 μm.

Example 10

Methylene chloride and 2,2'-bis(trifluoromethyl)benzidine (TPMB) were added to a reactor under a nitrogen atmosphere, and the mixture was thoroughly stirred for 6 hours. Then, isophthaloyl dichloride (IPC) and terephthaloyl dichloride (TPC) were added thereto and stirred, followed by dissolution and reaction. Then, a reaction product obtained by precipitation and filtration using an excessive content of methanol was vacuum-dried at 50° C. for 6 hours or more, and to the reaction product, DMAc was added together and dissolved in the reactor under a nitrogen atmosphere. Then, cyclobutane tetracarboxylic dianhydride (CBDA) was added and stirred until dissolved. Here, an amount of each monomer was adjusted so that a molar ratio of TFMB:CBDA:IPC:TPC was 100:30:30:40 as shown in a composition ratio of Table 1 below, and a temperature of the reactor was maintained at 40° C. A viscosity of the obtained resin composition was 6,730 cps, measured at 25° C. using a Brookfield viscometer. Next, pyridine and acetic anhydride in a content of 2.5 times more than the total content of cyclobutane tetracarboxylic dianhydride (CBDA) were added to the solution, and stirred at 60° C. for 1 hour. Here, the solution was controlled to have a solid content of 12 wt %, and solution casting was performed on a glass substrate using an applicator. The final solution had a viscosity of 35,300 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 50 μm.

Example 11

Methylene chloride and 2,2'-bis(trifluoromethyl)benzidine (TFMB) were added to a reactor under a nitrogen atmosphere, and the mixture was thoroughly stirred. Then, isophthaloyl dichloride (IPC) and terephthaloyl dichloride (TPC) were added thereto and stirred for 6 hours, followed by dissolution and reaction. Then, a reaction product obtained by precipitation and filtration using an excessive content of methanol was vacuum-dried at 50° C. for 6 hours or more, and to the reaction product, DMAc was added together and dissolved in the reactor under a nitrogen atmosphere. Then, cyclobutane tetracarboxylic dianhydride (CBDA) was added, and stirred well dissolved. Here, an amount of each monomer was adjusted so that a molar ratio of TFMB:CBDA:IPC:TPC was 100:13:22:65 as shown in a composition ratio of Table 1 below, and a temperature of the reactor was maintained at 40° C. A viscosity of the obtained resin composition was 12,880 cps, measured at 25° C. using a Brookfield viscometer. Next, pyridine and acetic anhydride in a content of 2.5 times more than the total content of cyclobutane tetracarboxylic dianhydride (CBDA) were added to the solution, and stirred at 60° C. for 1 hour Here, the solution was controlled to have a solid content of 12 wt %, and solution casting was performed on a glass substrate using an applicator. The final solution had a viscosity of 185,200 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 50 μm.

Comparative Example 1

N,N-dimethylacetamide (DMAc) and 2,2'-bis(trifluoromethyl)benzidine (TFMB) were added to a reactor under a nitrogen atmosphere, and the mixture was thoroughly stirred. Then, 4,4'-hexafluoroisopropylidene diphthalic anhydride (6FDA) was added thereto and stirred well until dissolved. Then, isophthaloyl dichloride (IPC) and terephthaloyl dichloride (TPC) were added thereto, and stirred for 6 hours, followed by dissolution and reaction, thereby preparing a polyamic acid resin composition. Here, an amount of each monomer was adjusted so that a molar ratio of TFMB:6FDA:IPC:TPC was 100:50:30:20 as shown in a composition ratio of Table 1 below and a solid content was 6.5 wt %, and a temperature of the reactor was maintained at 30° C. A viscosity of the obtained resin composition was 2,800 cps, measured at 25° C. using a Brookfield viscometer. Next, pyridine and acetic anhydride in a content of 2.5 times more than the content of cyclobutane tetracarboxylic dianhydride (CBDA) were added to the solution, and stirred at 60° C. for 1 hour. Here, the solution was controlled to have a solid content of 12 wt %, and solution casting was performed on a glass substrate using an applicator. The final solution had a viscosity of 12,100 cps, measured at 25° C. using a Brookfield viscometer. Then, the resultant product was heat-treated in a vacuum oven at 100° C. for 30 minutes, at 200° C. for 30 minutes, and at 300° C. for 30 minutes, and then cooled at room temperature. The film formed on the glass substrate was separated from the substrate to obtain a polyamideimide film having a thickness of 45 μm.

Comparative Example 2

N,N-dimethylacetamide (DMAc) and 2,2'-bis(trifluoromethyl)benzidine (TFMB) were added to a reactor under a nitrogen atmosphere, and the mixture was thoroughly stirred. Then, cyclobutane tetracarboxylic dianhydride (CBDA) was added thereto and stirred well until dissolved. Then, terephthaloyl dichloride (TPC) was added thereto, and stirred for 6 hours, followed by dissolution and reaction, thereby preparing a polyamic acid resin composition. Here, an amount of each monomer was adjusted so that a molar ratio of TFMB:CBDA:TPC was 100:50:50 as shown in a composition ratio of Table 1 below and a solid content was 5 wt %, and a temperature of the reactor was maintained at 30° C. Then, pyridine and acetic anhydride in a content of 2.5 times more than the content of cyclobutane tetracarboxylic dianhydride (CBDA) were added to the solution, and stirred at 60° C. for 1 hour. During this process, the solution was agglomerated, and formed in a non-uniform phase over time, and thus, the solution was broken like jelly at the time of stirring and there was no flowability, whereby the film formation could not be performed.

TABLE 1

| Classification | Composition ratio (molar ratio) | | | | | Uniformity of polymerization reaction | Thickness (μm) | Light transmittance (550 nm, %) | Yellow index | Blaze (%) | Modulus (GPa) | Light transmittance (400 nm, %) |
| --- | --- | --- | --- | --- | --- | --- | --- | --- | --- | --- | --- | --- |
| | TFMB | CBDA | IPC | TPC | 6FDA | | | | | | | |
| Example 1 | 100 | 20 | 30 | 50 | — | ○ | 46 | 89.5 | 2.72 | 0.54 | 5.75 | 83.3 |

TABLE 1-continued

| Classification | Composition ratio (molar ratio) | | | | | Uniformity of polymerization reaction | Thickness (μm) | Light transmittance (550 nm, %) | Yellow index | Blaze (%) | Modulus (GPa) | Light transmittance (400 nm, %) |
|---|---|---|---|---|---|---|---|---|---|---|---|---|
| | TFMB | CBDA | IPC | TPC | 6FDA | | | | | | | |
| Example 2 | 100 | 20 | 20 | 60 | — | o | 46 | 89.4 | 2.32 | 0.59 | 6.02 | 82.3 |
| Example 3 | 100 | 30 | 20 | 50 | — | o | 48 | 89.5 | 2.87 | 0.45 | 5.50 | 80.7 |
| Example 4 | 100 | 40 | 30 | 30 | — | o | 48 | 89.8 | 2.35 | 0.50 | 5.93 | 82.9 |
| Example 5 | 100 | 40 | 20 | 40 | — | o | 46 | 89.5 | 2.82 | 0.78 | 5.70 | 83.2 |
| Example 6 | 100 | 50 | 30 | 20 | — | o | 45 | 89.3 | 2.40 | 0.71 | 5.55 | 83.0 |
| Example 7 | 100 | 50 | 40 | 10 | — | o | 45 | 90.0 | 2.15 | 0.68 | 5.06 | 83.5 |
| Example 8 | 100 | 20 | 40 | 40 | — | o | 45 | 89.5 | 2.62 | 0.67 | 5.00 | 81.7 |
| Example 9 | 100 | 25 | 20 | 55 | — | o | 48 | 89.9 | 2.28 | 0.53 | 5.68 | 82.2 |
| Example 10 | 100 | 30 | 30 | 40 | — | o | 50 | 89.0 | 2.70 | 0.48 | 5.58 | 81.6 |
| Example 11 | 100 | 13 | 22 | 65 | — | o | 50 | 89.5 | 2.35 | 0.48 | 5.60 | 83.4 |
| Comparative Example 1 | 100 | — | 30 | 20 | 50 | x | 45 | 89.6 | 2.58 | 0.62 | 3.23 | 82.9 |
| Comparative Example 2 | 100 | 50 | 0 | 50 | — | x | — | — | — | — | — | — |

It could be confirmed from Table 1 that the Examples according to the present invention showed high light transmittance over an entire visible light wavelength region including long wavelength (550 nm) and short wavelength (400 nm) regions, and had a low Yellow index (YI) and a high modulus at the same time. Even though the films according to the Examples contained high content of aromatic diacid dichloride, uniformity of polymerization reaction was excellent, and film-forming properties were excellent. On the other hand, in Comparative Example 1, the modulus was significantly lowered, and in Comparative Example 2, the uniformity of polymerization reaction was remarkably reduced, and thus, it was difficult to form the film and physical properties thereof could not be measured.

The polyamideimide film according to the present invention may implement high light transmittance and low Yellow index to have excellent optical properties while maintaining inherent physical properties of excellent mechanical properties, heat properties, and electrical properties.

In addition, since the modulus may be remarkably improved to implement excellent mechanical strength, the polyamideimide film may be applied to various fields including a display, etc.

Hereinabove, although the present invention is described by limited Examples, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the claims to be described below as well as all modified equally or equivalently to the claims are intended to fall within the scopes and spirit of the present invention.

What is claimed is:
1. A polyamideimide film comprising:
   a polyamideimide resin derived from an aromatic diamine including:
      2,2'-bis(trifluoromethyl)benzidine;
      a cycloaliphatic dianhydride; and
      an aromatic diacid dichloride consisting of isophthaloyl dichloride (IPC) and terephthaloyl dichloride (TPC).
2. The polyamideimide film of claim 1, wherein the cycloaliphatic dianhydride is cyclobutane tetracarboxylic dianhydride.
3. The polyamideimide film of claim 1, wherein a content of the aromatic diacid dichloride ranges from 40 moles to 90 moles based on 100 moles of the aromatic diamine.
4. The polyamideimide film of claim 1, wherein the polyamideimide film has a light transmittance, measured at 550 nm, of 88% or more, and a Yellow index of 3.0 or less.
5. The polyamideimide film of claim 4, wherein the polyamideimide film has a modulus of 5.0 GPa or more, measured at an extension rate of 25 mm/min using UTM 3365 manufactured by Instron.
6. The polyamideimide film of claim 1, wherein the polyamideimide film has a light transmittance, measured at 550 nm, of 88% or more, and a Yellow index of 3.0 or less, based on a thickness of 45 to 55 μm.
7. The polyamideimide film of claim 6, wherein the polyamideimide film has a modulus of 5.0 GPa or more, measured at an extension rate of 25 mm/min using UTM 3365 manufactured by Instron, on a specimen having a thickness of 45 to 55 μm, a length of 50 mm, and a width of 10 mm.
8. A method for preparing a polyamideimide film comprising:
   (a) preparing a polyamic acid solution by dissolving aromatic diamine containing 2,2'-bis(trifluoromethyl)benzidine in an organic solvent, and adding and reacting cycloaliphatic dianhydride and an aromatic diacid dichloride consisting of isophthaloyl dichloride (IPC) and terephthaloyl dichloride (TPC);

(b) preparing polyamideimide resin by imidization of the polyamic acid solution; and (c) applying a polyamideimide solution in which the polyamideimide resin is dissolved in the organic solvent.

9. The method of claim 8, wherein the cycloaliphatic dianhydride is cyclobutane tetracarboxylic dianhydride.

10. The method of claim 8, wherein in step (b), the polyamic acid solution further includes any one or two or more selected from an imidization catalyst and a dehydrating agent.

11. The method of claim 8, wherein the polyamic acid solution in step (a) has a solid content of 3 to 20 wt %.

12. A polyamic acid resin derived from aromatic diamine including 2,2'-bis(trifluoromethyl)benzidine, a cycloaliphatic dianhydride, and an aromatic diacid dichloride consisting of isophthaloyl dichloride (IPC) and terephthaloyl dichloride (TPC).

13. The polyamideimide film of claim 1, wherein a molar ratio between the isophthaloyl dichloride (IPC) and the terephthaloyl dichloride (TPC) ranges from 0.3 to 4.0.

14. The method of claim 8, wherein a molar ratio between the isophthaloyl dichloride (IPC) and the terephthaloyl dichloride (TPC) ranges from 0.3 to 4.0.

15. The polyamic acid resin of claim 12, wherein a molar ratio between the isophthaloyl dichloride (IPC) and the terephthaloyl dichloride (TPC) ranges from 0.3 to 4.0.

* * * * *